(12) United States Patent
Nakano et al.

(10) Patent No.: US 7,554,717 B2
(45) Date of Patent: Jun. 30, 2009

(54) OPTICAL TRANSMISSION DEVICE EQUIPPED WITH PLUGGABLE VARIABLE OPTICAL ATTENUATOR

(75) Inventors: Hiroyuki Nakano, Yokohama (JP); Tetsuya Uda, Yokohama (JP); Yasuhiro Uchiyama, Yokohama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 5 days.

(21) Appl. No.: 11/473,162

(22) Filed: Jun. 23, 2006

(65) Prior Publication Data
US 2007/0041085 A1 Feb. 22, 2007

(30) Foreign Application Priority Data
Aug. 18, 2005 (JP) ............................. 2005-237561

(51) Int. Cl.
*H01S 4/00* (2006.01)
*G02B 6/42* (2006.01)
*H04B 10/17* (2006.01)

(52) U.S. Cl. ...................................... 359/333; 385/140
(58) Field of Classification Search ................. 385/140; 359/333
See application file for complete search history.

(56) References Cited

U.S. PATENT DOCUMENTS

| 4,989,938 | A | * | 2/1991 | Tamulevich | 385/33 |
|---|---|---|---|---|---|
| 5,066,094 | A | * | 11/1991 | Takahashi | 385/73 |
| 5,136,681 | A | * | 8/1992 | Takahashi | 385/140 |
| 5,267,342 | A | * | 11/1993 | Takahashi et al. | 385/140 |
| 6,433,925 | B1 | | 8/2002 | Sakano et al. | |
| 6,681,073 | B2 | * | 1/2004 | Chan et al. | 385/140 |
| 6,917,731 | B2 | * | 7/2005 | Bennett et al. | 385/15 |
| 2002/0122634 | A1 | * | 9/2002 | Miyake et al. | 385/78 |
| 2003/0152326 | A1 | * | 8/2003 | Morimoto et al. | 385/34 |
| 2003/0175030 | A1 | * | 9/2003 | Chen et al. | 398/85 |
| 2004/0141709 | A1 | * | 7/2004 | Anderson et al. | 385/140 |
| 2006/0013553 | A1 | * | 1/2006 | Imai et al. | 385/140 |

FOREIGN PATENT DOCUMENTS

| JP | 11-017259 | 1/1999 |
|---|---|---|
| JP | 2004-363948 | 12/2004 |

* cited by examiner

*Primary Examiner*—Eric Bolda
(74) *Attorney, Agent, or Firm*—Antonelli, Terry, Stout & Kraus, LLP.

(57) ABSTRACT

Disclosed is an optical transmission device with a simple configuration that can attenuate an input optical power only when it is necessary so that it falls within a predetermined range, and can suppress insertion loss when it is unnecessary. A variable optical attenuator is configured pluggable. A pluggable variable optical attenuator is equipped with an optical connector that is an interface of an optical signal and an electrical signal connector for receiving an electrical signal that specifies the amount of control used for feedback-controlling the attenuation, and controls the attenuation depending on the input optical power of the optical transmission board. Moreover, an optical through that has the same shape as the variable optical attenuator being configured pluggable and that is configured pluggable is prepared.

5 Claims, 14 Drawing Sheets

502 Pluggable variable optical attenuator
55 Optical attenuation medium
58B Optical connector
57B Collimator lens
12 Optical fiber pig-tail
57A Collimator lens
56 Electrical signal supply connector 602 Pluggable optical through
59B Optical connector
12 Optical fiber pig-tail

OPTICAL TRANSMISSION DEVICE EQUIPPED WITH PLUGGABLE VARIABLE OPTICAL ATTENUATOR

BACKGROUND OF THE INVENTION

This invention relates to an input power level control technology of an optical transmission device used for an optical transmission system, especially to an input power level control technology of an optical transmission device that directly receives an input from optical fiber, such as of an optical amplifier and an optical transmitter receiver.

Optical transmission devices, such as an optical amplifier, have characteristics of wideband and low noise. The optical amplifier is important, especially in the optical transmission system of the WDM (Wavelength Division Multiplexing) method, in order to collectively amplify optical signals of a plurality of wavelengths and thereby increase a transmission length, and is widely used in optical transmission systems.

FIG. 16 shows a configuration example of an optical transmission system using optical amplifiers. In this example, to simplify its explanation, only one-way transmission from a node A 701 in the left of the figure to a node D 704 in the right is shown.

Output lights of wavelengths λ1-λn from an optical transmitter 100 are wavelength-multiplexed by a multiplexer 501 and sent out onto an optical fiber transmission line 600. The multiplexed lights that reached the receiving side are demultiplexed by an optical demultiplexer 502 for demultiplexing wavelength-multiplexed lights, which are received by optical receivers 200 capable of receiving the respective wavelengths λ1-λn.

In the optical fiber transmission line 600, there are provided a repeater optical amplifier 350 that is a node B 702 for compensating a loss of the optical fiber transmission line 600, an optical add/drop multiplexer 503 that is a node C 703 for dropping and adding only some wavelengths (λi), and the like. Moreover, for each of the node C 703, and the node D 704, receiving optical amplifiers 400 each of compensating a loss in the optical fiber transmission line 600 are used. For the node C 703, a transmittion optical amplifier 300 compensating a loss of the optical add/drop multiplexer 503 is used.

Because of differences among the lengths between nodes, loss characteristics, the numbers of optical connector connections, etc., the optical fiber transmission line 600 may exhibit a wide range of the transmission loss. For this reason, optical transmission devices, such as optical amplifiers, that receive the input directly from the optical transmission line 600 are required to have a wide dynamic range of input.

For example, in the case where an Er (erbium) doped optical fiber amplifier is used for an optical amplifier, the gain and output optical power of the optical amplifier are determined by the Er concentration and a length of the Er-doped optical fiber and pumping optical power used. Then, gain saturation depending on the input power to the optical amplifier limits the dynamic range of input.

Generally, since the WDM optical amplifier needs to perform an operation of constant gain regardless of change in the number of wavelengths to be amplified, the input dynamic range is often set to about 5 to 7 dB. Therefore, if an input power range of about 20 dB is required in order to cope with various transmission line losses, it is necessary to adjust the optical input power level using a separate optical attenuator.

FIG. 17 is a functional block diagram of an optical amplification board 11 that constitutes an optical amplifier. The optical amplification board 11 has an optical amplification unit 40, an optical amplification unit control circuit 41 for controlling the optical amplification unit 40, and an optical input-connector 20 and an optical output connector 30 that interface with the optical fiber 11.

Since generally the optical amplification board 11 used for an optical transmission device does not have a function of controlling an optical input power of the optical amplification unit 40, it is necessary to install a fixed or variable optical attenuator 801 externally and adjust the optical input power.

It is often the case that a loss of an optical transmission line is unknown until starting up the transmission device. Therefore, when installing a fixed optical attenuator externally, it is necessary to prepare many kinds of fixed optical attenuators beforehand, which will force complicated and uneconomical stock control of fixed optical attenuators.

When installing a variable optical attenuator externally, it is necessary to manually adjust a variable optical attenuator, while measuring the optical input power of the optical amplification unit 40. For this reason, there are problems that installation cost of the device may arise and reliability may fall because of artificial mistakes.

It is natural that securing a space to install a fixed optical attenuator or variable optical attenuator is required. For the installation place, it is necessary to choose a place that gives good workability for installation/removal and adjustment of an optical attenuator.

The above-mentioned subject is the same also in an optical transmission device that receives an input directly from the optical fiber: transmission line 600, such as a transponder reception unit and a wavelength multiplexer input unit, as well as the optical amplifier.

In order to accommodate various optical interfaces flexibly, a detachable (pluggable) optical transceiver module has been proposed and is being used widely in optical transmission systems (for example, see JP 2004-363948 A). As a device to solve complexity in installing and removing a fixed optical attenuator, there is a plug-type attenuator.

Moreover, as a device to resolve a labor in adjusting a variable attenuator, there is an optical amplification board equipped with an automatic adjusting mechanism for the attenuation (see JP H11-17259 A). FIG. 18 shows an optical amplification board 12 equipped with an automatic adjustment mechanism. The optical amplification board 12 shown in FIG. 18 is the optical amplifier board 11 shown in FIG. 17 added with a structure for controlling an input optical power to be kept at a constant. In the optical amplifier board 12, light inputted from the optical input connector 20 through the optical fiber 11 is inputted to the optical amplification unit 40 through a variable optical attenuator 802 and the optical splitter 52. Light partly branched by the optical splitter 52 is detected by the opto-electronic conversion circuit 53, and fed back to the variable optical attenuator 802 by a constant-input-power control circuit 54 that controls the detected optical power so that it is kept at a specific value.

Since an interface of the plug-type attenuator is an optical connector, it cannot be made variable. On the other hand, the optical amplifier board 12 can perform automatic control of an optical input power to the optical amplification unit 40. However, the variable optical attenuator 802 and the optical amplification unit 40 were integrated into one piece to form the optical amplifier board 12. Therefore, even when the variable optical attenuator 802 is unnecessary, it cannot be removed. Especially, the variable optical attenuator 802 has an insertion loss of about 1-2 dB even when the attenuation is set to a minimum. Accordingly, when the variable optical attenuator 802 is unnecessary, this corresponds equivalently to a case where the noise factor of the optical amplification unit 40 becomes worse by 1-2 dB. Although the loss is as small as only 1-2 dB, this directly affects OSNR (Optical signal-to-Noise Ratio) of an optical amplification repeater system, and reduces a number of repeater stages or a transmission distance by 20-40%, resulting in increased number of stages.

For OSNR, please refer to the following expression described also in ITU-T Recommendation G.692.

$$OSNR = Pout - L - NF - 10\,\text{Log}(N) - 10\,\text{Log}(hv\Delta v_o)$$

Pout: Output power (dBm)
L: Span loss (dB)
NF: Noise factor (dB)
N: Number of spans
h: Planck's constant
v: Optical frequency
$\Delta v_o$: Optical bandwidth The present invention was made in view of the above-mentioned situation, and aims at providing an optical transmission device with a simplified configuration that can attenuate optical input power only when it is necessary so that it falls within a range and suppress the transmission loss when it is unnecessary.

SUMMARY OF THE INVENTION

An aspect of this invention resides in a variable optical attenuator that is pluggable to an optical connector of an optical transmission board, having: optical attenuation means that can attenuate an optical signal inputted from an optical fiber and adjust the attenuation of the optical signal depending on a given electrical signal; a first optical connector that establishes connector connection with the optical transmission board and outputs an optical signal outputted from the optical attenuation means; and a first electrical connector that establishes connector connection with the optical transmission board and receives an electrical signal input for adjusting the attenuation generated by the transmission board.

BRIEF DESCRIPTION OF THE DRAWINGS

Embodiments of the present invention will be described in detail based on the following figures, wherein.

DETAILED DESCRIPTION OF THE PREFERRED EMBODIMENTS

First Embodiment

Before explaining embodiments to which this invention is applied, an outline of this invention will be described. In this invention, the variable optical attenuator is designed to be pluggable. Further, an optical variable optical attenuator that is made pluggable is inserted in the optical transmission board, such as an optical amplification board, whose power of input light needs to be adjusted by an optical attenuator, as needed. Moreover, the variable optical attenuator that is configured pluggable has a built-in automatic constant-optical-level control circuit for feedback-controlling the variable optical attenuator to a specific value and is equipped with an interface through which an electrical signal for feedback control from the optical transmission board is received. When it is not necessary to control the power of the input light by attenuation, the variable optical attenuator is removed or an optical through device of the same size is inserted.

Hereafter, a first embodiment of the invention will be described, taking an optical transmission device of an optical amplifier as an example.

Figure 1:
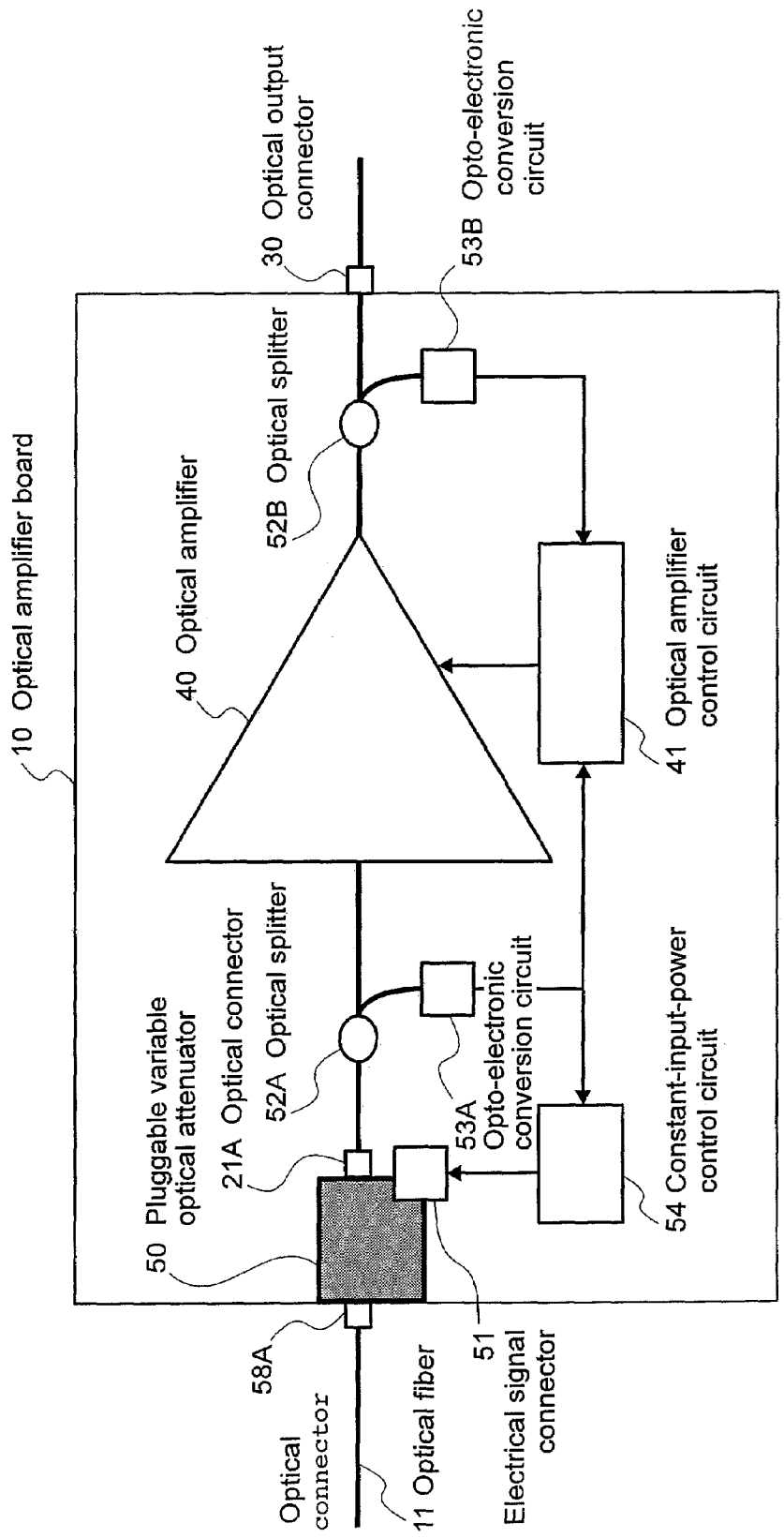
FIG. 1 is a block diagram of an optical amplifier of a first embodiment such that a pluggable variable attenuator is housed in an optical amplifier board.

FIG. 1 is a block diagram of an optical amplifier that houses a pluggable variable optical attenuator 50 of this embodiment in its optical amplifier board 10. The optical amplifier board 10 used in the optical amplifier has an optical amplification unit 40 realized with an erbium doped fiber optical amplifier etc., an optical connector 21A, the optical output connector 30, an optical amplification unit control circuit 41, optical splitters 52A, 52B, opto-electronic conversion circuits 53A, 53B, a constant-input-power control circuit 54, and an electrical signal connector 51.

The optical amplification unit control circuit 41 is an electronic circuit that monitors an input power coming in the optical amplification unit 40 with the optical splitter 52A and an output power coming from the optical amplification unit 40 with the optical splitter 52B by putting the light into the opto-electronic conversion circuits 53A and 53B, and controls the gain or output power of an optical amplification unit 40.

The optical connector 21B is an interface for receiving optical signal for a pluggable variable optical attenuator 50 of an input unit of the optical amplification unit 40. The electrical signal connector 51 is an interface of an electrical signal of a current or voltage to and from the pluggable variable optical attenuator 50.

The output of the pluggable variable optical attenuator 50 is inputted into the optical amplification unit 40 through the optical connector 21A and the optical splitter 52. Light that is partly branched by the optical splitter 52 is converted into an electrical signal by the opto-electronic conversion circuit 53 and inputted into the constant-input-power control circuit 54. The electrical signal inputted into the constant-input-power control circuit 54 is converted into a current-based or voltage-based electrical signal for specifying the attenuation in the pluggable variable optical attenuator 50 so that the input power is maintained constant, and outputted to the pluggable variable optical attenuator 50 through the electrical signal connector 51.

Figure 2:
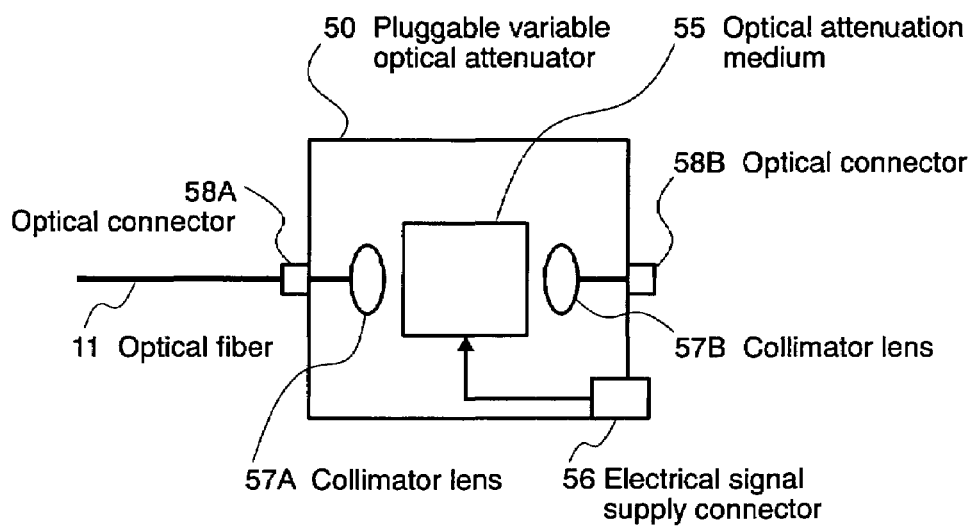
FIG. 2 is a block diagram of the pluggable variable optical attenuator of the first embodiment.

FIG. 2 shows a structure of the pluggable variable optical attenuator 50 to be connected. The pluggable variable optical attenuator 50 is a device that can control the attenuation thereof by voltage or current. As shown in this figure, the pluggable variable optical attenuator 50 has an optical attenuation mechanism 55; collimator lenses 57A, 57B, optical connectors 58A, 58B, and an electrical signal connector 56.

The optical connector 58A is an interface with the optical fiber 11 that is external optical fiber, and the optical connector 58B is an interface with the optical connector 21B of the optical amplifier board 10. Moreover, the electrical signal connector 56 is an interface with the electrical signal connector 51 of the optical amplifier board 10.

The collimator lens 57A and the collimator lens 57B are inserted between the optical connector 58A and the optical attenuation mechanism 55, and between the optical attenuation mechanism 55 and the optical connector 58B, respectively. A light beam that is inputted from the optical connector 58A and collimated by the collimator lens 57A is attenuated by the optical attenuation mechanism 55, further collimated by the collimator lens 57B, and outputted from the optical connector 58B.

The optical attenuation mechanism 55 attenuates inputted light using the magnetooptic effect, the thermooptic effect, MEMS (Micro-Electro-Mechanical Systems), etc. The attenuation thereof can be varied by applying a current or voltage. The optical attenuation mechanism 55 receives a current-based or voltage-based electrical signal for specifying the attenuation that is outputted from the constant-input-power control circuit 54 of the optical amplifier board 10 through the electrical signal connector 51 and the electrical signal connector 56, controls the attenuation variably so that an input of the optical amplification unit 40 becomes constant, and attenuates the optical power.

Incidentally, the optical connectors 58A, 58B of the pluggable variable optical attenuator 50 and the optical connector 21A of the optical amplifier board 10 are general optical connectors, such as the SC type single-core optical fiber connector and the MU type optical fiber connector. What is necessary for the optical connector 58B and the optical connector 21A is that the both are connectors of the same type so that mating becomes possible.

Figure 3:
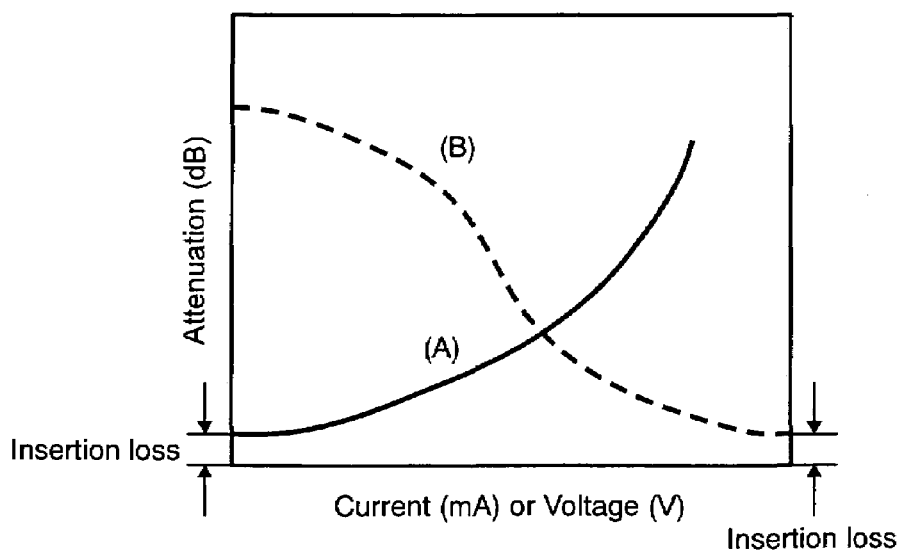
FIG. 3 is a graph showing one example of basic characteristics of the pluggable variable attenuator of the first embodiment.

Next, basic characteristics of the pluggable variable optical attenuator 50 of this embodiment will be explained. FIG. 3 is a view showing one example of the basic characteristics of the pluggable variable optical attenuator 50. In this figure, the horizontal axis represents a current (mA) or voltage (V) value. Moreover, the vertical axis represents the attenuation (dB).

As shown in this figure, the attenuation with respect to the current or voltage of the pluggable variable optical attenuator 50 of this embodiment varies as shown by (A) (Normally open) or (B) (Normally close). The pluggable variable optical attenuator 50 of this embodiment uses these characteristics, realizes a control of the attenuation by current or voltage, and controls the power of output light to be kept at constant.

As can be understood from this figure, for either of the pluggable variable optical attenuators 50 with the above-mentioned (A) characteristic or the (B) characteristic, there is an insertion loss of (1-2 dB) at a state where the attenuation is set to a minimum. Therefore, even when attenuation is unnecessary, the optical power suffers attenuation as long as the light passes through the pluggable variable optical attenuator 50.

Moreover, in the case where a permissible range of the optical amplifier board 10 is −20 dBm to −25 dBm and the input optical power is −24 dBm or the like, attachment of the pluggable variable optical attenuator 50 may reduce the input optical power lower than −25 dBm because of an insertion loss of 1-2 dB and may deviate it out of the permissible range.

When it is unnecessary to adjust the input optical power by attenuating it or when the input optical power is likely to go out of the permissible range because of its connection, what is necessary is to directly connect the optical fiber 11 to the optical connector 21A of the optical amplifier board 10 provided that the optical connector 58A of the pluggable variable optical attenuator 50 and the optical connector 21A of the optical amplifier board 10 are the same in shape and the optical fiber 11 has a margin of length.

However, in the case where the optical connector 58A of the pluggable variable optical attenuator 50 and the optical connector 21A of the optical amplifier board 10 are different in shape or the optical fiber 11 has no margin of length, a pluggable optical through 60 is prepared as an optical through device.

The pluggable optical through 60 will be explained below.

Figure 4:
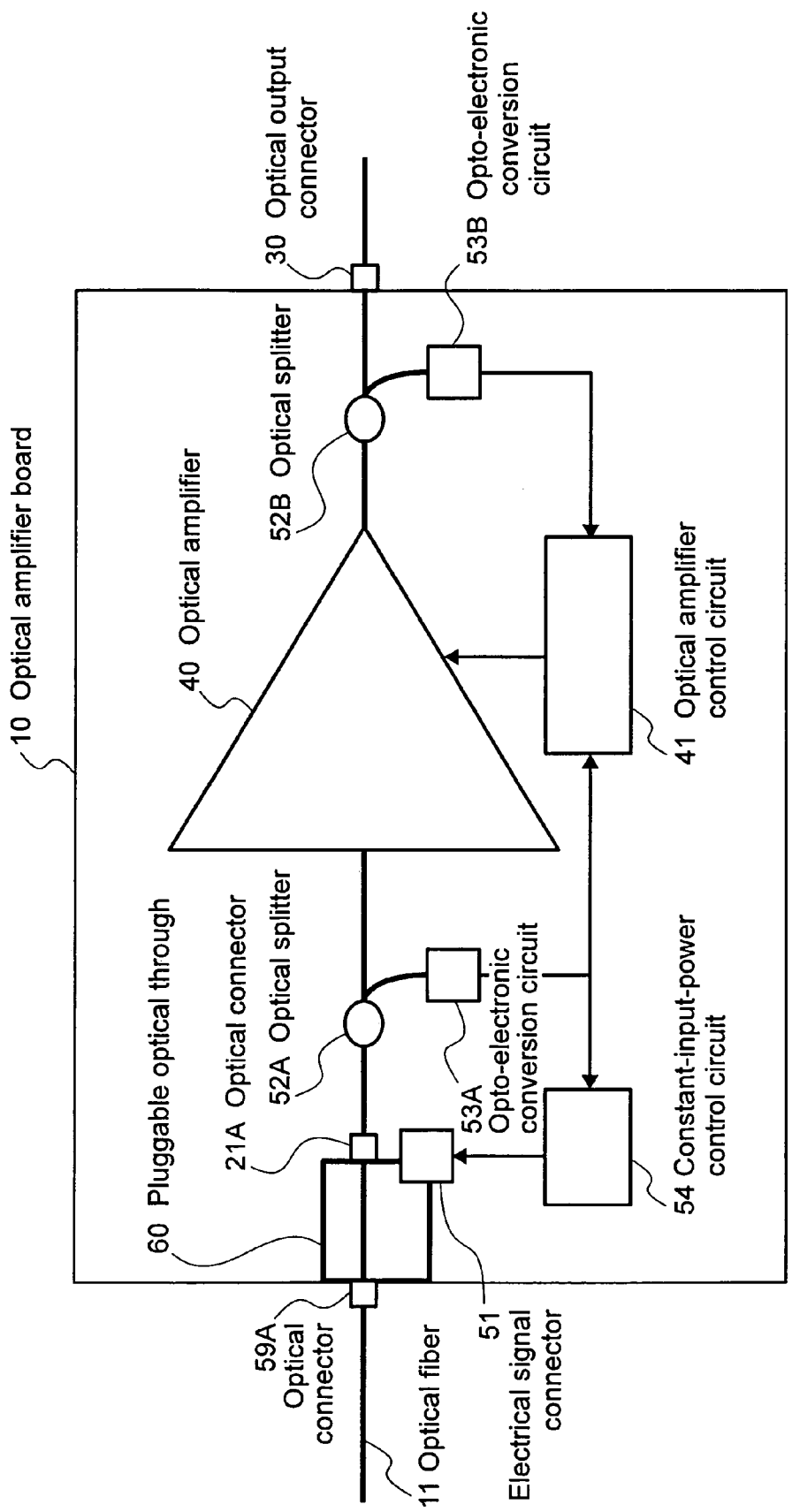
FIG. 4 is a block diagram of the optical amplifier such that a pluggable optical through is installed in the optical amplifier board of the first embodiment.
Figure 5:
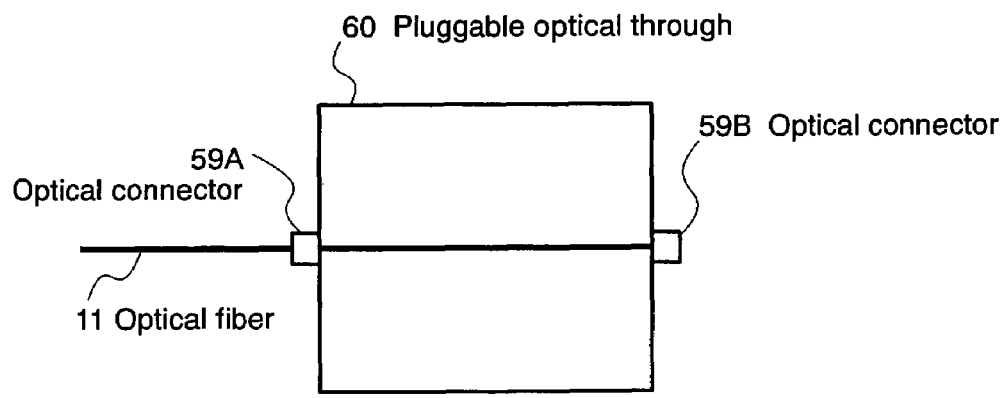
FIG. 5 is a block diagram of the pluggable optical through of the first embodiment.

FIG. 4 is a block diagram of an optical amplifier of this embodiment in which the pluggable variable optical attenuator 50 is removed from the optical amplifier board 10 and the alternative pluggable optical through 60 is installed. Moreover, FIG. 5 shows a configuration of the pluggable optical through.

The pluggable optical through 60 of this embodiment is equipped with an optical connector 59A whose shape is the same (same type) as the optical connector 58A of the pluggable variable optical attenuator 50 and an optical connector 59B whose shape is the same (same type) as the optical connector 58B. The both optical connectors are connected with each other through the optical fiber 11. Therefore, optically, the pluggable optical through 60 of this embodiment has an optical connector function of being through in a passive mode, and the loss can be suppressed to about 0.2-0.3 dB, which is equivalent to an optical connector.

The pluggable optical through 60 is used instead of the pluggable variable optical attenuator 50. That is, when it is unnecessary to adjust the input optical power by reducing it, the pluggable variable optical attenuator 50 is removed and alternatively the pluggable optical through 60 is installed. Therefore, its appearance is specified to be the same as the pluggable variable optical attenuator 50. Since the pluggable optical through 60 does not have the electrical signal connector 56 and is passive, the loss is unchanged even when it makes a contact with an electrical signal connector 51 in the optical amplifier board 10.

Note that what is necessary is that the pluggable optical through 60 has a length of the pluggable variable optical attenuator 50 without a part of the electrical signal connector 56 in the appearance. That is, the distance between the optical connectors 59A and 59B should be equivalent to the distance between the optical connector 58A and the optical connector 58B of the pluggable variable optical attenuator 50, and should have dimensions that allow it to be housed in a port that is opened for installing the pluggable variable optical attenuator 50 on the optical amplifier board 10 side.

Next, appearances of the devices will be described.

Figure 6:
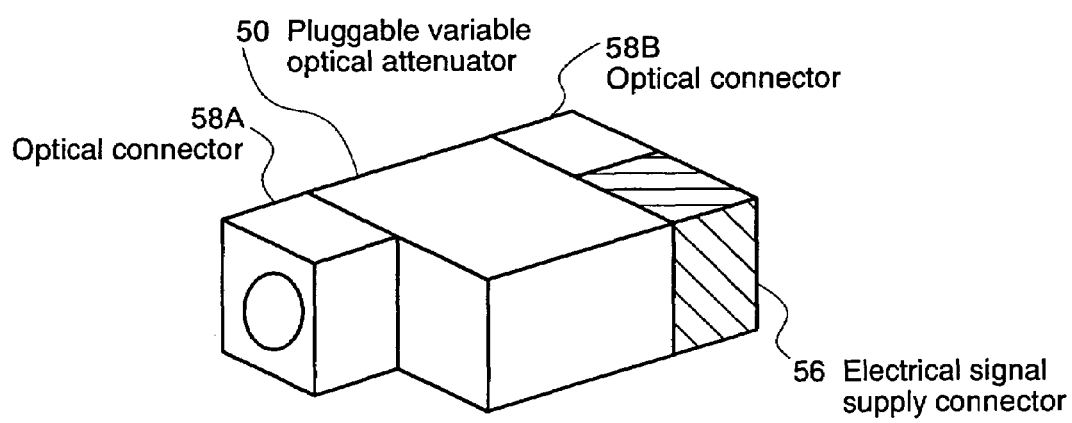
FIG. 6 is a general view of the pluggable variable optical attenuator of the first embodiment.
Figure 7:
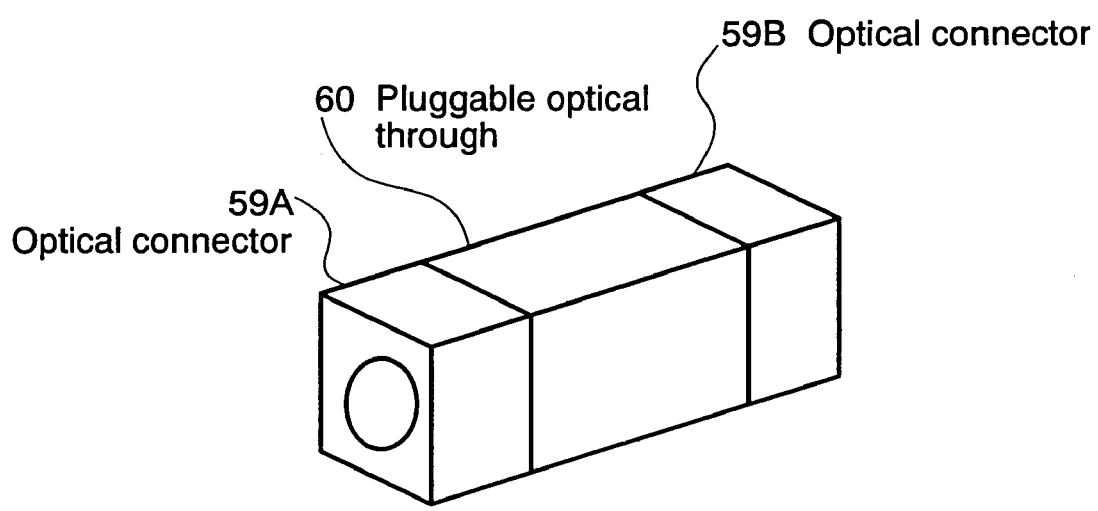
FIG. 7 is a general view of the pluggable optical through of the first embodiment.

FIG. 6 shows one example of a general view of the pluggable variable optical attenuator 50, and FIG. 7 shows one example of a general view of the pluggable optical through 60, respectively. Moreover, FIG. 8 shows a front view of a WDM device shelf 1000 in which the optical amplification board 10 is stored and FIG. 9 shows a general view of the optical amplification board 10.

Figure 8:
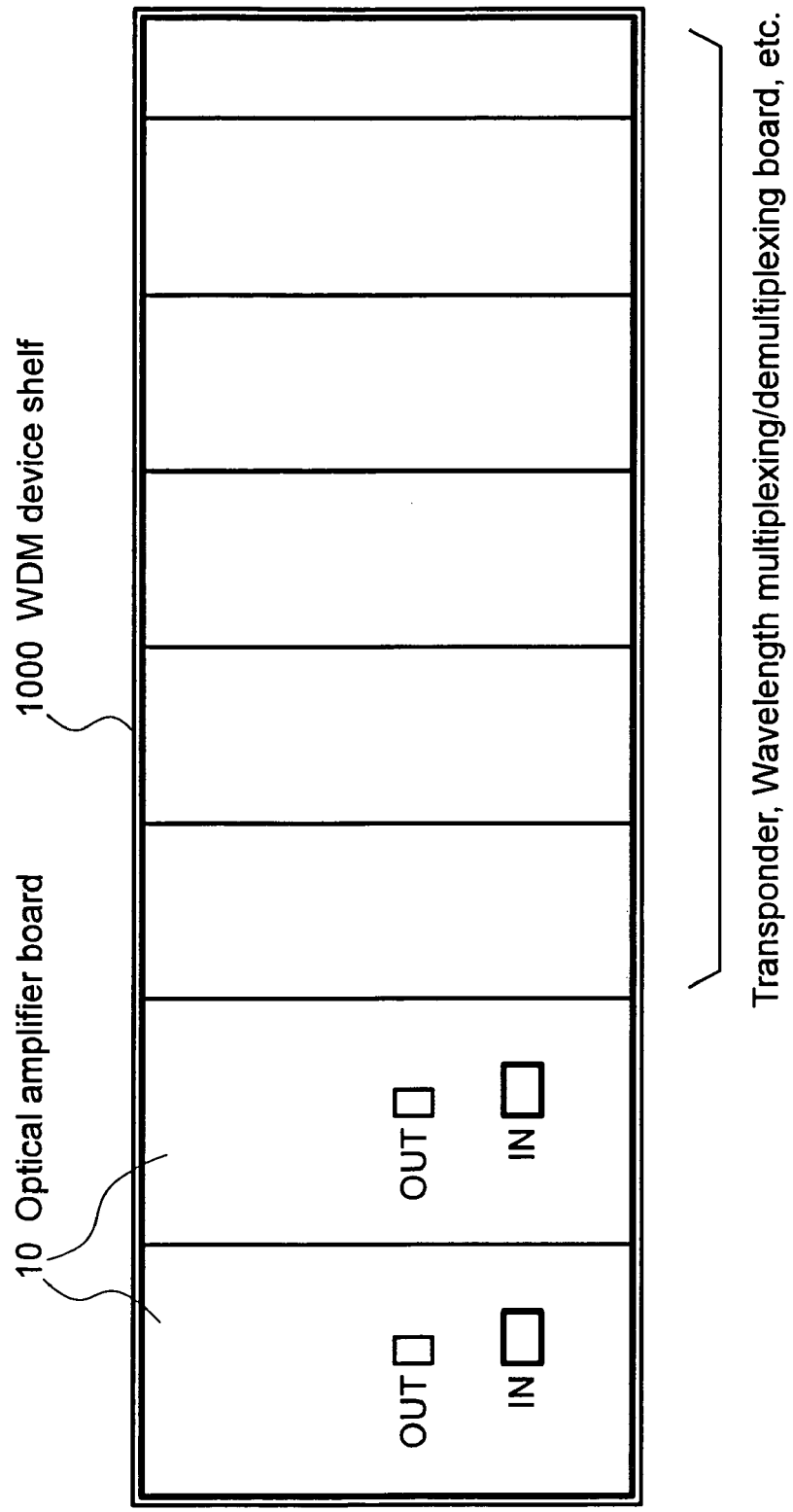
FIG. 8 is a front view of a WDM device shelf in which the optical amplification boards of the first embodiment are stored.

The WDM device shelf 1000 of FIG. 8 is an example where two optical amplifier boards 10 are installed at the leftmost part. A transponder, a wavelength multiplexing/demultiplexing board, etc. are installed at a remaining right part.

Figure 9:
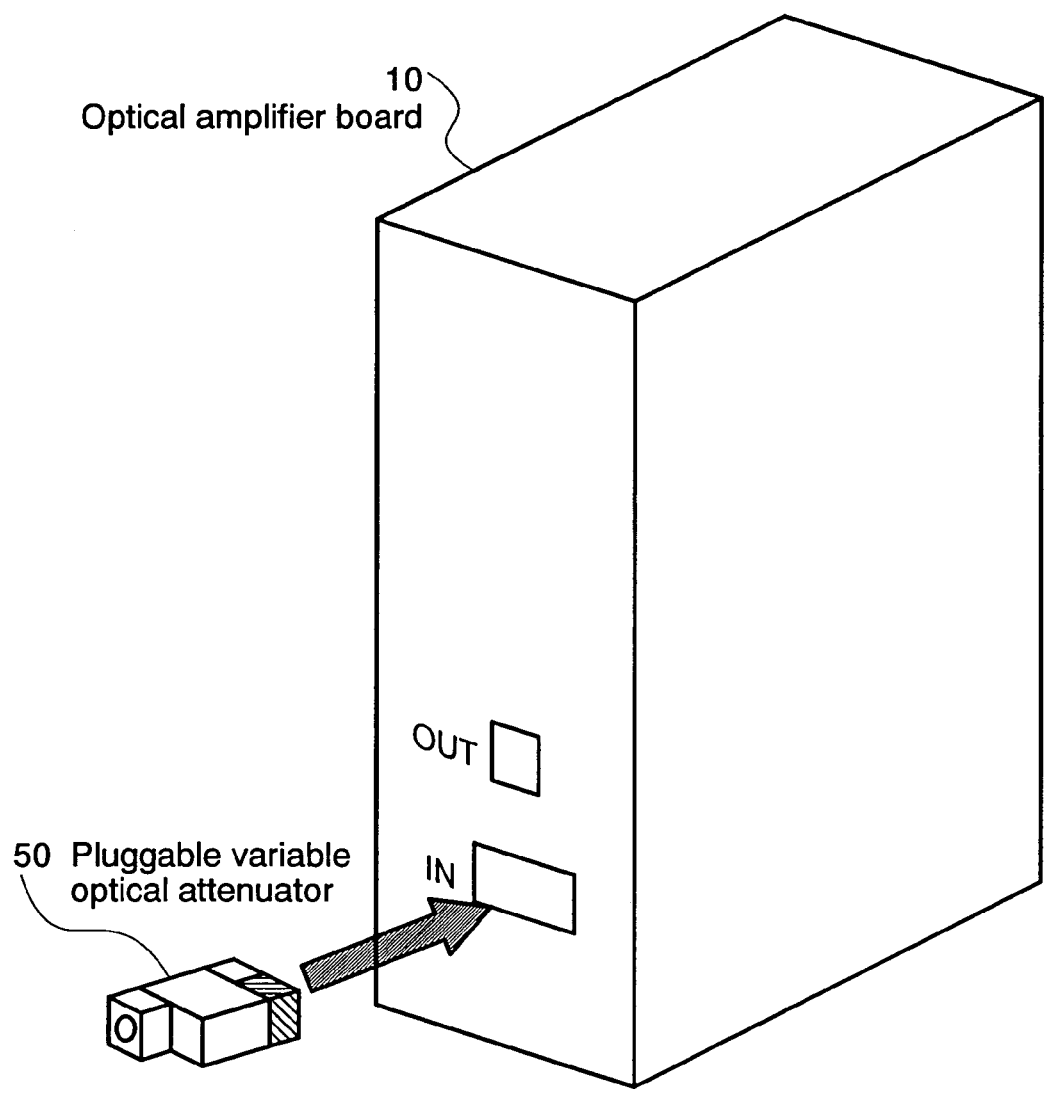
FIG. 9 is a general view of the optical amplification board of the first embodiment.

The optical amplification board 10 of FIG. 9 is taken out from the WDM shelf 1000 of FIG. 8. The optical amplifier board 10 of this embodiment is specified to have a structure that enables the pluggable variable attenuator or the pluggable optical through to be installed on a front panel side of the board. Specifically, a front part of the optical amplifier board 10 is equipped with an input port (IN) and an output port (OUT). In the input port (IN), the pluggable variable optical attenuator 50 shown in FIG. 6 can be attached to and detached from the input port (IN). Similarly, the pluggable optical through 60 can also be attached to and detached from the input port (IN). When attenuation is unnecessary, the pluggable optical through 60 is attached instead the pluggable variable optical attenuator 50.

The pluggable variable optical attenuator 50 that is installed is connected with a control circuit in the optical amplifier board 10 with the optical connectors 58A, 21A and the electrical signal connectors 51, 56, and realizes automatic control of the optical input power.

As described above, the pluggable variable optical attenuator 50 has an insertion loss of about 1-2 dB even when it is set to a minimum. According to this embodiment, when attenuation is unnecessary, by using the pluggable optical through 60 instead of the pluggable variable optical attenuator 50, the above-mentioned insertion loss can be eliminated and a loss of the input unit of the optical amplifier 40 can be minimized in the optical amplifier board 10.

According to this embodiment, an automatic constant-optical-level control circuit for controlling the variable optical attenuator at a specific value that consists of the optical splitter 52A, the opto-electronic conversion circuit 53A, and the constant-input-power control circuit 54 has been incorporated in the input unit of the optical amplifier board 10. In addition, the automatic constant-optical-level control circuit is configured to be able to generate its output from the electrical signal connector 51. Moreover, the pluggable variable optical attenuator 50 that is an object to be controlled has the electrical signal connector 56 connectable with the electrical signal connector 51, and a control voltage can be obtained from the automatic constant-optical-level control circuit through the connector.

According to this embodiment, interfaces between the pluggable variable optical attenuator 50 and the optical amplifier board 10 are the optical connector and the electrical connector, which makes attachment and removal of the attenuator easy. Moreover, since they are of connector types, connection and disconnection by attachment and detachment are easy.

Therefore, according to this embodiment, as described above, only by inserting the pluggable variable optical attenuator 50, the input power level of the amplification unit can be automatically adjusted and adjustment man-hour can be reduced. As a result, various types of optical amplifier boards that will be necessary depending on optical input power levels can be reduced. Therefore, an installation space of the optical attenuator for adjusting the input power level of the optical amplification unit can be eliminated. Moreover, many types of optical amplifier boards, many types of fixed optical attenuators that are necessary depending on the optical input power levels, and inventory control of these boards and devices can be reduced.

On the other hand, if the attenuation is unnecessary, the variable attenuator can easily be removed because it is structured pluggable. And similarly the optical through that is structured pluggable can be installed easily. By changing the pluggable variable optical attenuator 50 to the pluggable optical through 60, essentially the insertion loss by the variable optical attenuator can be eliminated.

Therefore, according to this embodiment, regarding optical attenuation processing in an optical transmission device, simple installation, maintenance, and operation of an attenuator becomes possible, while maintaining a loss by insertion of the attenuator to a minimum.

Note that although, as means for changing a variable optical attenuator and an optical through device easily, there is a method of installing 1×2 optical switch after these devices, the optical switch itself has an insertion loss and is expensive, the method is not usable realistically.

In the explanation of the above-mentioned embodiment, although the case where the pluggable variable optical attenuator 50 was applied to the optical amplifier was explained as an example, application objects of this embodiment are not limited to this. For example, it is possible to apply the pluggable variable optical attenuator 50 of this embodiment also to a transponder receive unit, a wavelength multiplexer input unit, etc. In the cases of application to these units, like the case where it is applied to the above-mentioned optical amplifier, an optical attenuator that is usually unnecessary can be installed only when it is necessary. Therefore, when the optical amplifier is introduced and maintained at the time of construction of an optical network, the cost-performance of the system can be enhanced and the system configuration can be simplified.

Second Embodiment

Next, a second embodiment to which this invention is applied will be described. This embodiment has basically the same configuration as that of the first embodiment. However, a pluggable variable optical attenuator 502 of this embodiment does not have the optical connector 58A. Moreover, similarly a pluggable optical through 602 does not have the optical connector 59A. Instead of these connectors, optical fiber pigtails 12 are attached, respectively.

Figure 10:
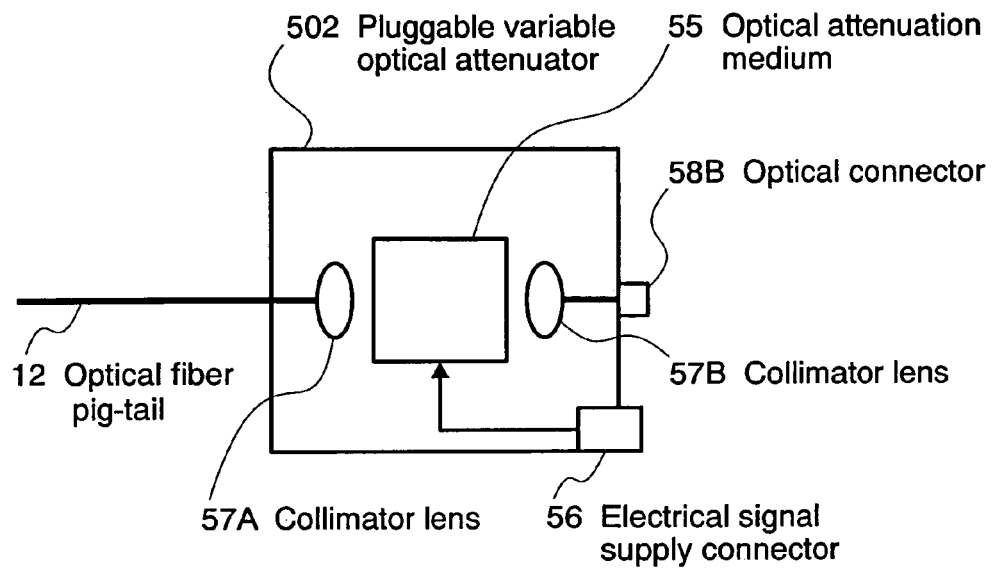
FIG. 10 is a block diagram of a pluggable variable optical attenuator of a second embodiment.
Figure 11:
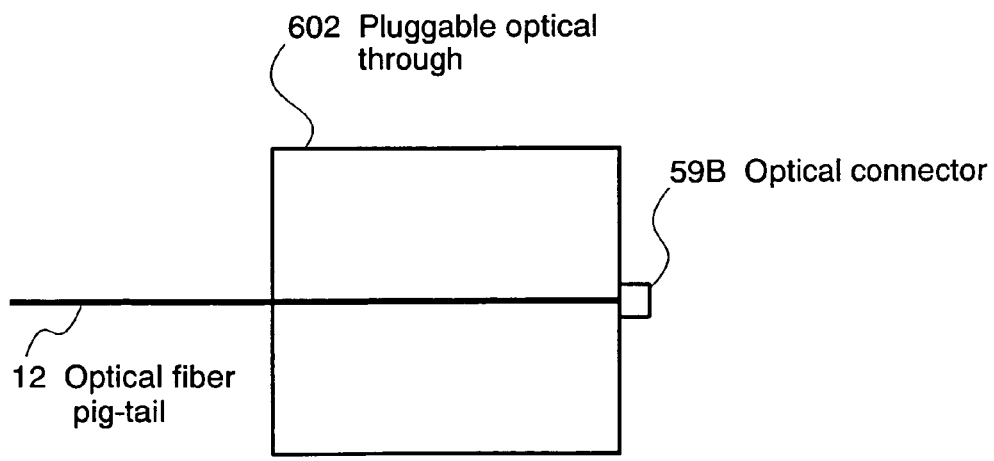
FIG. 11 is a block diagram of a pluggable optical through of the second embodiment.
Figure 12:
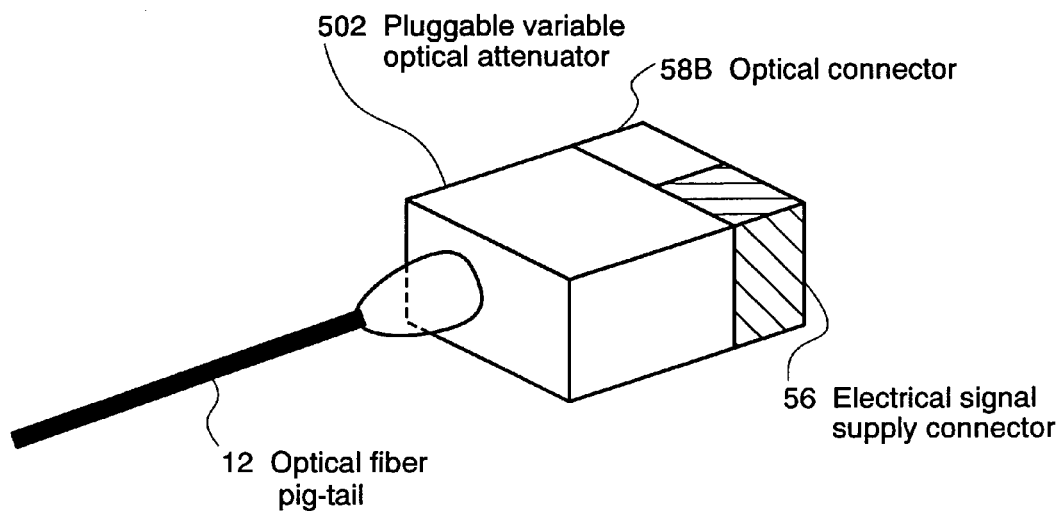
FIG. 12 is a general view of the pluggable variable optical attenuator of the second embodiment.
Figure 13:
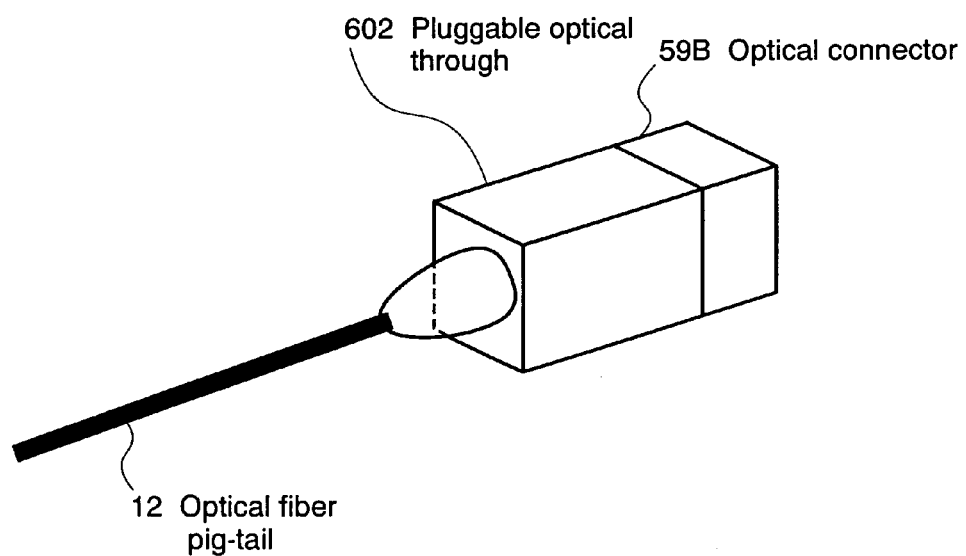
FIG. 13 is a general view of the pluggable optical through of the second embodiment.

FIG. 10 and FIG. 11 are block diagrams of the pluggable variable optical attenuator 502 and the pluggable optical through 602 of this embodiment, respectively. FIGS. 12 and 13 are general views of the pluggable variable optical attenuator 502 and the pluggable optical through 602 of this embodiment, respectively. Since respects other than differences described above are the same as those of the first embodiment, their explanation will be omitted here.

In this embodiment, optical fiber and a pluggable device that is either the pluggable variable optical attenuator 502 or the pluggable optical through 602 are combined into a single piece. That is, according to this embodiment, since the optical connector units can be reduced by unity as compared to the first embodiment, a lower-loss and high-reliability optical transmission device can be realizable. Note that other effects that can be attained with this embodiment are the same as those of the first embodiment.

Third Embodiment

Next, a third embodiment to which this invention is applied will be described.

This embodiment is an example of a case where the pluggable variable optical attenuator 50 of the first embodiment is applied to an optical transmitter receiver.

Figure 14:
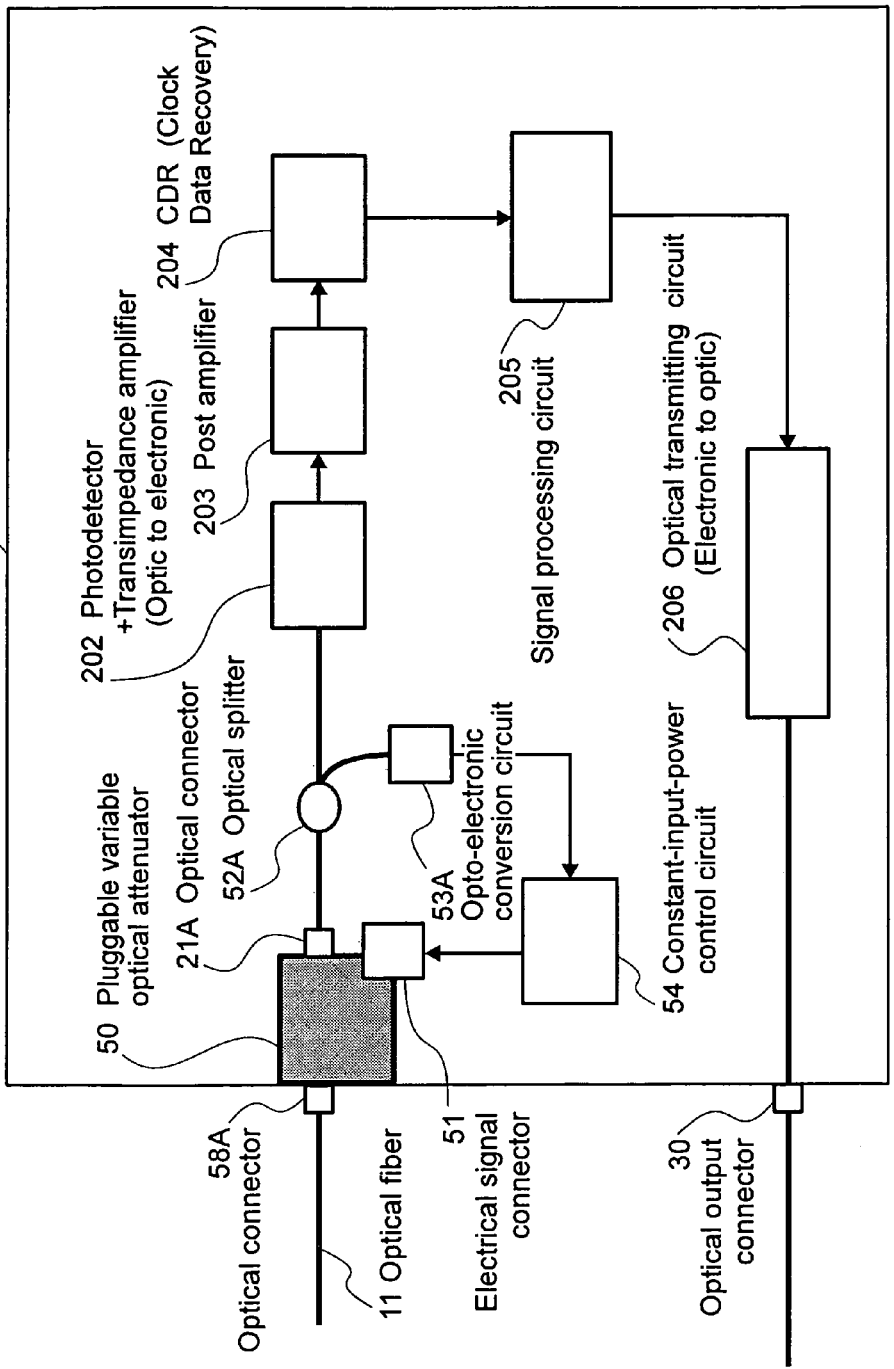
FIG. 14 is a block diagram of an optical transmitter receiver such that a pluggable variable optical attenuator of a third embodiment is housed in its optical transmitter receiver board.

FIG. 14 is a block diagram of an optical receiver housed in an optical transmitter receiver board 201 of this embodiment. As shown in this figure, the optical transmitter receiver board 201 has a photodetector, a transimpedance amplifier (light→electricity) 202, a post amplifier 203, a CDR (clock data recovery) 204, a signal processing circuit 205, and an optical transmission circuit (electricity→light) 206 as an optical receiver unit. Moreover, it has the optical connector 21A and the optical output connector 30 as interfaces. Furthermore, an input from the optical connector 21A is inputted into the photodetector, the transimpedance amplifier (light→electricity) 202, and the opto-electronic conversion circuit 53A through the optical splitter 52A. An output of the opto-electronic conversion circuit 53A is inputted into the constant-input-power control circuit 54. An output of the constant-input-power control circuit 54 is supplied to the outside through the electrical signal connector 51.

In order to keep the optical input power to the photodetector and the transimpedance amplifier (light→electricity) 202 in a predetermined range, the constant-input-power control circuit 54 of this embodiment outputs a current-based or voltage-based electrical signal and controls the pluggable variable optical attenuator 50 being connected thereto through the electrical signal connector 51.

Here, the pluggable variable optical attenuator 50 and the pluggable optical through 60 used in this embodiment are the same as those of the first embodiment.

The optical connector 21A of the optical transmitter receiver board 201 is of an optical connector shape that can be engaged with the optical connector 58B of the pluggable variable optical attenuator 50, like the optical connector of the optical connector of the first embodiment. Moreover, the electrical signal connector 51 of the electrical connector shape that can be connected with the electrical signal connector 56 of the pluggable variable optical attenuator 50. Therefore, the pluggable variable optical attenuator 50 can make it possible to easily realize connection and disconnection to and from the optical transmitter receiver board 201 by attachment/detachment thereof.

Therefore, also in this embodiment, simply by inserting the pluggable variable optical attenuator 50 like the first embodiment, an input power level of the photodetector and the transimpedance amplifier (light→electricity) 202 can be adjusted automatically and adjustment man-hour can de curtailed. As a result, the optical input power level can be fixed and excessive input power can be suppressed automatically.

Figure 15:
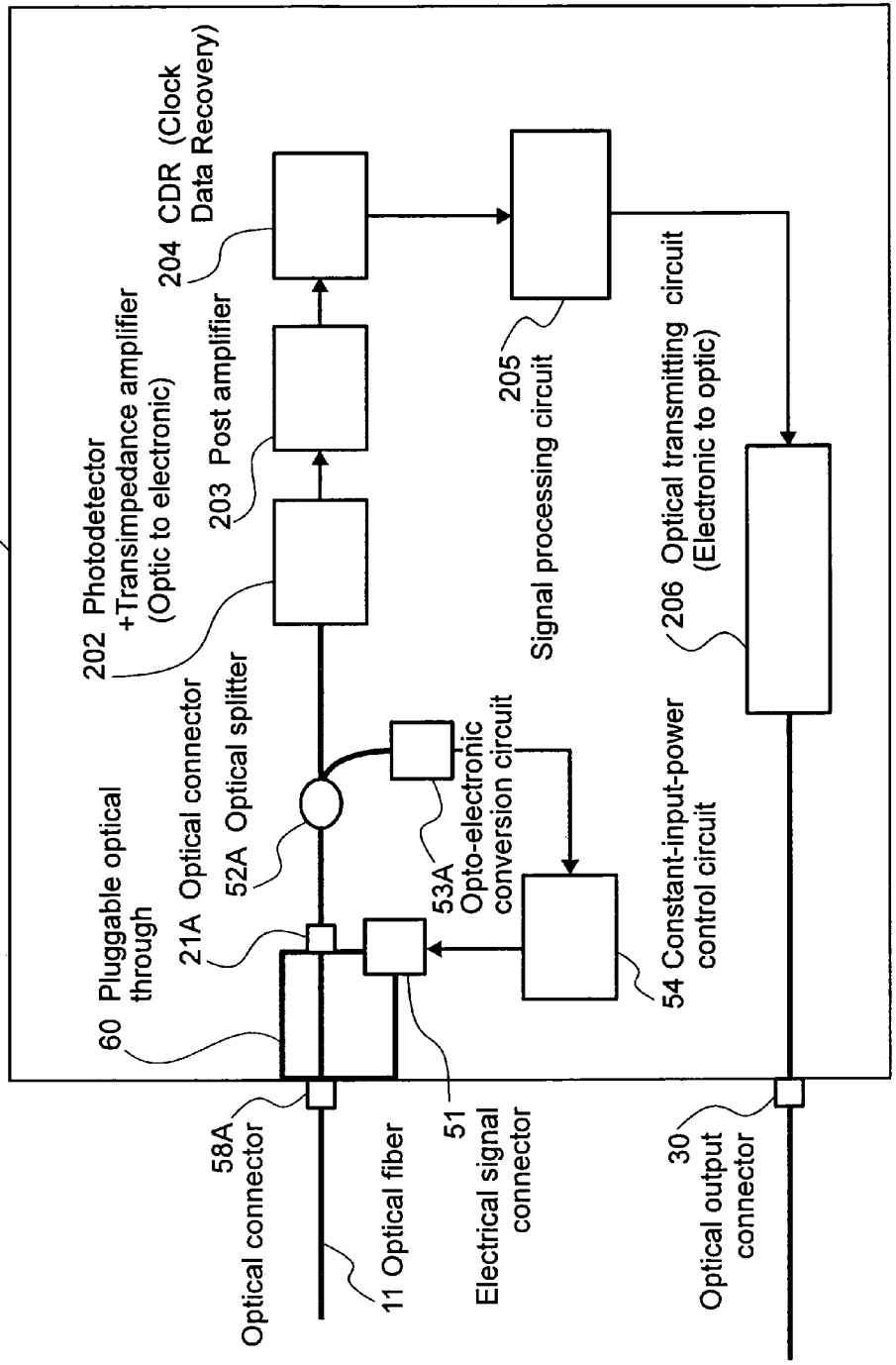
FIG. 15 is a block diagram of an optical transmitter receiver such that a pluggable optical through is attached on its optical transmitter receiver board of the third embodiment.
Figure 16:
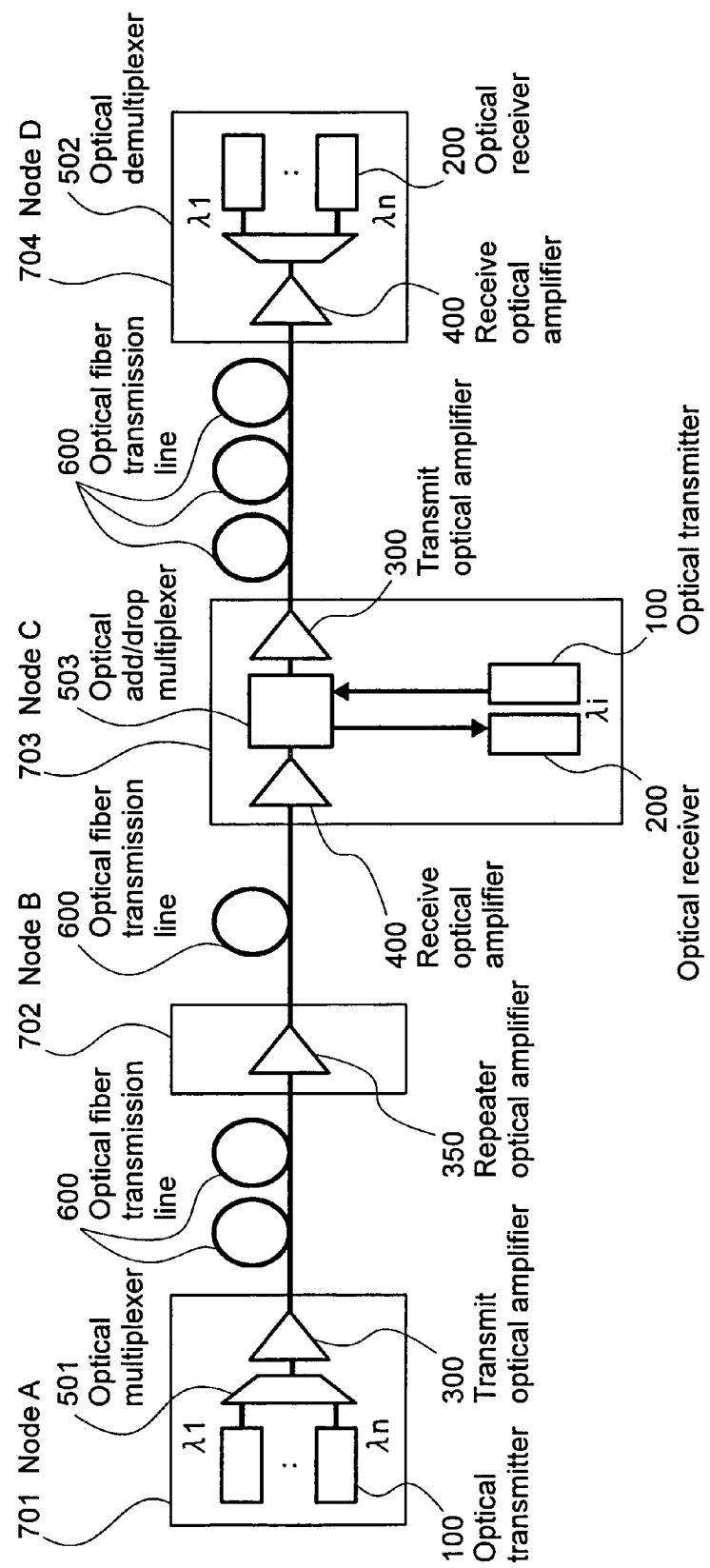
FIG. 16 is a diagram showing a configuration example of an optical transmission system using optical amplifiers.
Figure 17:
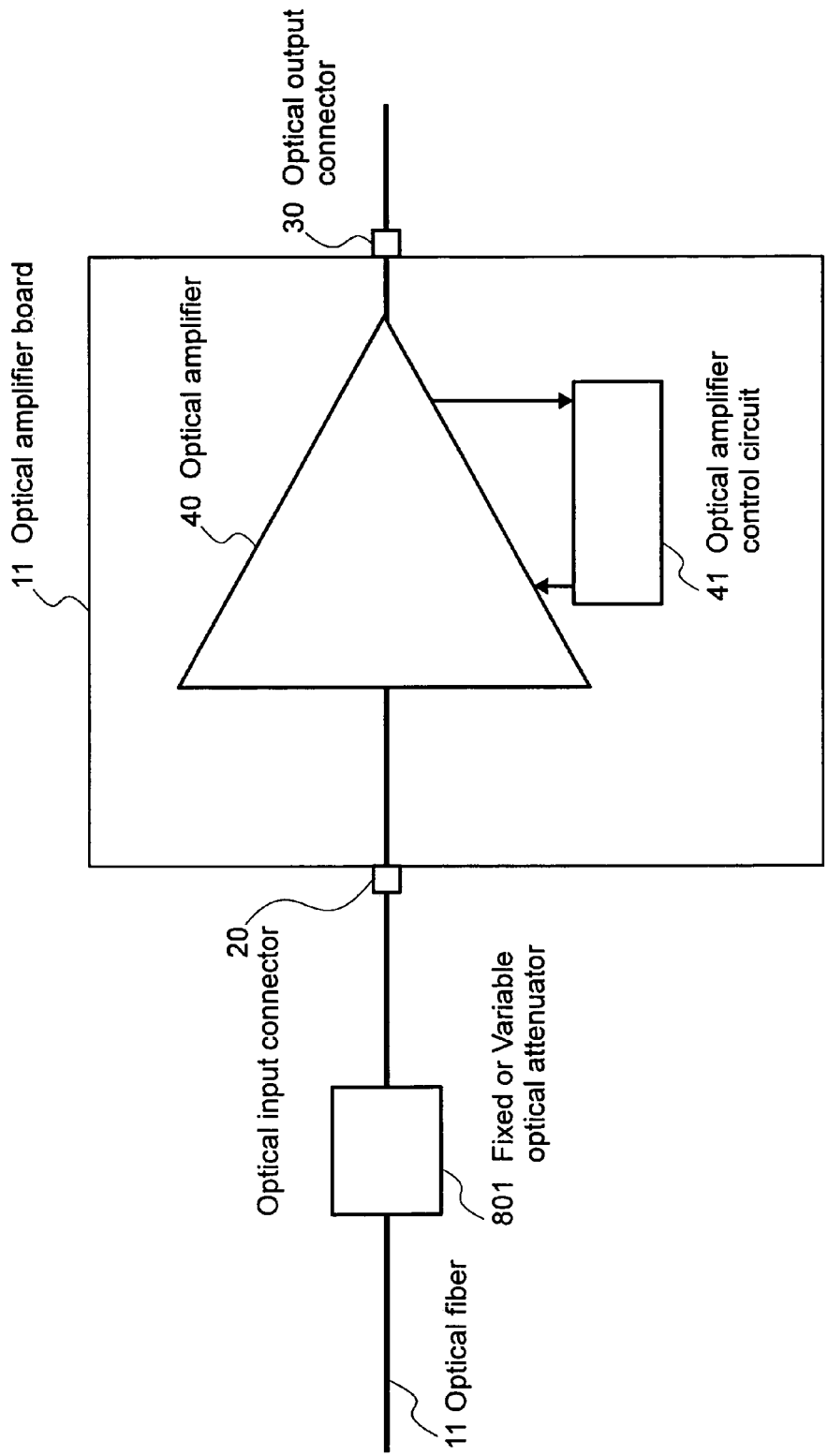
FIG. 17 is a functional block diagram of an optical amplification board that constitutes an optical amplifier.
Figure 18:
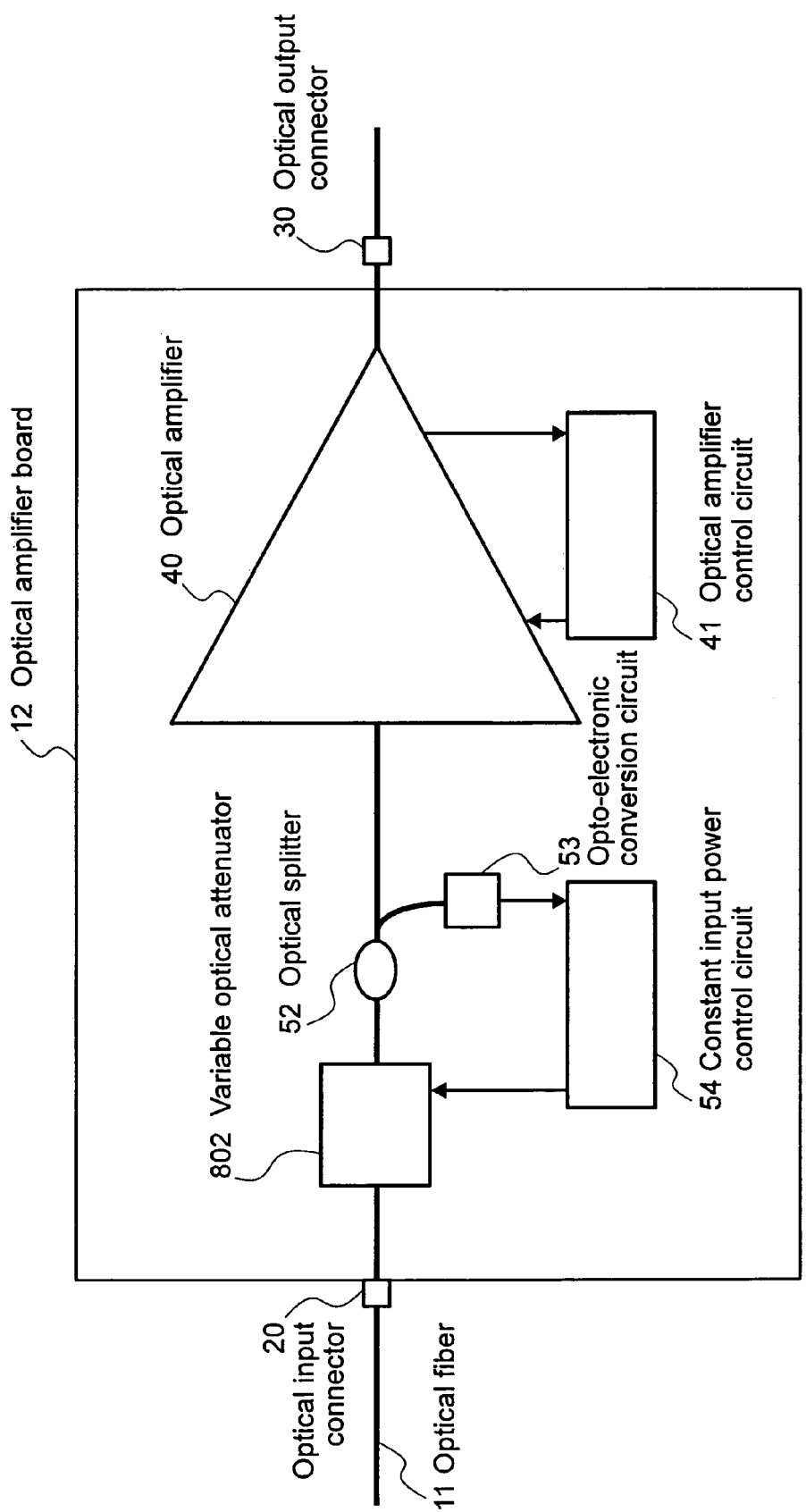
FIG. 18 is a functional block diagram of another optical amplification board that constitutes an optical amplifier.

FIG. 15 shows a configuration of the third embodiment with the pluggable variable optical attenuator 50 being removed and the pluggable optical through 60 being installed instead. The pluggable optical through 60 of this embodiment has the same configuration and shape as those of the pluggable optical through 60 of the first embodiment.

Also in this embodiment, in the case where attenuation of an input optical power is unnecessary, by using the pluggable optical through 60 instead of the pluggable variable optical attenuator 50, it is possible for the optical transmitter receiver board 201 to eliminate an insertion loss caused by the pluggable variable optical attenuator 50 and minimize an input unit loss to the photodetector and the transimpedance amplifier (light→electricity) 202.

It is common also in a commercialization system that the input power of the optical transmitter receiver board varies by a few dB due to influences of gain tilt, change in the number of wavelengths, polarization dependent loss, fiber loss variation, etc. in a multi-stage optical amplification repeater system. Worse still in ultra high-speed optical receivers of 10 Gbit/s or 40 Gbit/s, since their dynamic ranges are 10 dB to a few dB, variation in input power to the optical transmitter receiver board poses a serious problem.

According to this embodiment, also in the case of the optical transmitter receiver, when it is used at a minimum receiving sensitivity, that is, when attenuation is unnecessary, the pluggable optical through 60 is used, whereby reception sensitivity performance that the optical transmitter receiver board 201 essentially has can be obtained being not impaired.

As was explained above, according to this embodiment, the input power can be attainted suitably without preparing a plurality of optical attenuators and without increasing adjustment, and when attenuation is unnecessary, optical attenuation with a small loss can be realized.

Incidentally, also in this embodiment, the pluggable variable optical attenuator 502 and the pluggable optical through 602 explained in the second embodiment may be used instead of the pluggable variable optical attenuator 50 and the pluggable optical through 60, respectively. Like the second embodiment described above, since this configuration reduces one optical connector site, this configuration can attain lower-loss and high-reliability input power attenuation can be attained.

Adjustment of the optical input power level of an optical transmission device is an important problem in an optical amplification board having a comparatively narrow input dynamic range and a high-speed optical transmitter receiver board (especially 10 Gbit/s, 40 Gbit/s, etc.). As explained above, according to each of the above-mentioned embodiments, automatic adjustment of the input power, reduction in the number of types of the boards, lower noise, and space saving can be realized simultaneously because the optical attenuator is equipped with an interface for feedback control and its configuration is pluggable. Each of the above-mentioned embodiments has a large merit in reducing costs in installation, operation, and maintenance of an optical transmission device, and has a very high possibility of being used as a basic configuration in the future optical network industry.

In this way, according to this invention, there can be provided an optical transmission device that can attenuate the input optical power only when it is necessary with a simple configuration and suppress the transmission loss when it is unnecessary.

The foregoing invention has been described in terms of preferred embodiments. However, those skilled, in the art will recognize that many variations of such embodiments exist. Such variations are intended to be within the scope of the present invention and the appended claims.

What is claimed is:

1. An optical transmission device, comprising: a variable optical attenuator device, adapted for detachable use, that includes optical attenuation means that can attenuate an optical signal inputted from optical fiber and adjust the attenuation of the optical signal according a given electrical signal, a first optical connector for outputting an optical signal outputted from the optical attenuation means, and a first electrical connector for receiving an electrical signal input given to the optical attenuation means; and an optical transmission board that includes a second optical connector, adapted to be engaged with the first optical connector, that receives an output from the variable optical attenuator device, optical transmission means, adapted to be connected with the second optical connector, that processes an optical signal inputted through the second optical connector, control means, adapted to be connected with the second optical connector, that controls the attenuation using an optical signal inputted through the second optical connector, and a second electrical connector, adapted to be engaged with the first electrical connector, that outputs an electrical signal generated by the control means, wherein the optical transmission board receives the optical signal attenuated by the variable optical attenuator device via the first optical connector and the second optical connector, and wherein the optical transmission means is optical amplification means for amplifying an optical signal inputted through the second optical connector.

2. The optical transmission device according to claim 1, wherein the variable optical attenuator device further includes a third optical connector that establishes optical connector connection with the optical fiber.

3. The optical transmission device according to claim 1, wherein the optical transmission board further includes a port for housing the variable optical attenuator device or the optical through device.

4. An optical transmission device comprising: a detachable optical through device that a variable optical attenuator device, adapted for detachable use, includes optical attenuation means that can attenuate an optical signal inputted from an optical fiber and adjust the attenuation of the optical signal depending on the given electrical signal, a first optical connector for outputting the optical signal outputted from the optical attenuation means, and a first electrical connector for receiving an input of the electrical signal being given to the optical attenuation means;

an optical through device, adapted for detachable use and to allow a optical signal to pass through, that includes a second optical connector for receiving an optical signal input from the optical fiber and outputting it; and an optical transmission board has a third optical connector, adapted to be engaged with either the first optical connector or the second optical connector, that receives an output from the variable optical attenuator device, optical transmission means, adapted to be connected with the third optical connector, that processes an optical signal inputted through the third optical connector, control means, adapted to be connected with the third optical connector, that controls the attenuation of the inputted light using an optical signal inputted through the third optical connector, and a second electrical connector, adapted to be engaged with the first electrical connector, that outputs an electrical signal generated by the control means, wherein the optical transmission board receives either the optical signal attenuated by the variable optical attenuator device via the first optical connector and the second optical connector, or the optical signal passing through the optical through device via the second optical connector and the third optical connector, and wherein the optical transmission means is optical amplification means for amplifying an optical signal inputted through the second optical connector.

5. An optical transmission device comprising:

a variable optical attenuator device, adapted for detachable use, includes optical attenuation means that can attenuate an optical signal inputted from an optical fiber and adjust the attenuation of the optical signal depending on the given electrical signal, a first optical connector for outputting the optical signal outputted from the optical attenuation means, and a first electrical connector for receiving an electrical signal input given to the optical attenuation means;

an optical transmission board that includes a second optical connector, adapted to be engaged with the first optical connector, that receives an output from the variable optical attenuation device, optical transmission means, adapted to be connected with the second optical connector, that processes an optical signal inputted through the second optical connector, control means, adapted to be connected with the second optical connector, that controls the attenuation using an optical signal inputted through the second optical connector, and a second electrical connector, adapted to be engaged with the first electrical connector, that outputs an electrical signal generated by the control means, wherein the optical transmission board further includes a port located on an outer surface of the optical transmission device for housing the variable optical attenuator, wherein the optical transmission board receives the optical signal attenuated by the variable optical attenuator device via the first optical connector and the second optical connector and wherein the optical transmission means is optical amplification means for amplifying an optical signal inputted through the second optical connector.

* * * * *